United States Patent
Burghaus et al.

(10) Patent No.: US 7,079,965 B2
(45) Date of Patent: Jul. 18, 2006

(54) METHOD AND SYSTEM FOR THE AUTOMATIC DESIGN OF EXPERIMENTS

(75) Inventors: Rolf Burghaus, Kaarst (DE); Georg Mogk, Köln (DE); Thomas Mrziglod, Bergisch Gladbach (DE); Peter Hübl, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 472 days.

(21) Appl. No.: 10/373,470

(22) Filed: Feb. 25, 2003

(65) Prior Publication Data

US 2003/0237058 A1 Dec. 25, 2003

(30) Foreign Application Priority Data

Mar. 1, 2002 (DE) .................................. 102 09 146

(51) Int. Cl.
*G06F 3/00* (2006.01)

(52) U.S. Cl. .................... 702/81; 702/84; 702/182; 702/183

(58) Field of Classification Search ............... 702/84, 702/103, 182, 183, 186, 190, 81, 82; 705/37; 707/10; 709/247

See application file for complete search history.

(56) References Cited

U.S. PATENT DOCUMENTS

| | | | | |
|---|---|---|---|---|
| 6,081,766 A | * | 6/2000 | Chapman et al. | 702/27 |
| 6,421,612 B1 | * | 7/2002 | Agrafiotis et al. | 702/19 |
| 6,460,036 B1 | * | 10/2002 | Herz | 707/10 |
| 6,614,428 B1 | * | 9/2003 | Lengyel | 345/420 |
| 6,826,300 B1 | * | 11/2004 | Liu et al. | 382/159 |

* cited by examiner

*Primary Examiner*—Marc S. Hoff
*Assistant Examiner*—Felix Suarez
(74) *Attorney, Agent, or Firm*—Norris, McLaughlin & Marcus

(57) ABSTRACT

The invention relates to a method for the automatic design of experiments, having the following steps:
  inputting a similarity measure of two experiments,
  inputting a weighting measure for an individual experiment,
  determining a quality measure based on the similarity measure and the weighting measure,
  finding a number of experiments where the quality measure assumes an extreme value.

17 Claims, 3 Drawing Sheets

METHOD AND SYSTEM FOR THE AUTOMATIC DESIGN OF EXPERIMENTS

The invention relates to a method for the automatic design of experiments and to a corresponding computer program product and a system for the automatic design of experiments.

Various methods for designing experiments and tests are known from the prior art. The terms "experiment" and "test" are used synonymously below.

It is known from the prior art to design tests by means of statistical experimental design methods. Such design methods are used, inter alia, for the purpose of determining with a minimum number of tests an empirical process model for the relationship between the controlled and disturbance variables in a process and the resulting product and process properties. Such statistical experimental design can be carried out, for example, with the aid of the "STAVEX" (STAtistische Versuchsplanung mit EXpertensystem) [Statistical Experimental design with an Expert System]. A further commercially available computer program for experimental design is the "Statistica®" program, StatSoft (Europe) GmbH.

Various experimental design types are distinguished in the prior art in the field of statistical experimental design. Distinction is made, in particular, between the classical, fully factorial method, and modern methods after Taguchi or Shainin.

The classical, fully factorial method is the origin of all statistical experimental design methods. It is based on a comparison of all the quality-determined factors with one another along the lines of variance analysis. Numerous variants have been elaborated in the course of the preceding decades and validated in research and development laboratories.

However, for reasons of costs it is predominantly the modern methods after Taguchi and Shainin that are found in application.

The Shainin-DOE (DOE=Design of Experiment) is held to be a suitable method for process optimization because it isolates so-called "strong" influencing variables and examines these for relevance and dependence.

The Taguchi-DOE is based on previous, fractional factorial, orthogonal experimental designs. Because of the drastic savings in test runs through the preselection of the most important influencing variables, this is a fast and relatively economical method of test and process planning.

Further known statistical experimental design types are fractional factorial experimental designs, Plackett-Burmann experimental designs, central composite plans, Box-Behnken test designs, D-optimal designs, mixed designs, balanced block designs, Latin squares, desperado designs (in this connection, compare also http://www.versuchsplanung.de).

Further experimental design methods are known from Hans Bendemer, "Optimale Versuchsplanung" ["Optimal Experimental Design"], Reihe Deutsche Taschenbücher (DTB, Vol. 23, and ISBN 3-87144-278-X) as well as Wilhelm Kleppmann, Taschenbuch Versuchsplanung, (Manual of Experimental Design) "Produkte und Prozesse optimieren" ["Optimization of Products and Processes"] $2^{nd}$, expanding edition, ISBN: 3-466-21615-4.

Furthermore, a method for controlling a production process via an efficient experimental design is known from U.S. Pat. No. 6,009,379. In this case, test points are distributed uniformly on a multidimensional spherical surface in order to weight the individual production parameters uniformly.

The object of the invention is to create an improved method for the automatic design of experiments, as well as a corresponding computer program product and system.

The object of the invention is achieved in each case with the aid of the features of the independent patent claims. Preferred embodiments of the invention are specified in the dependent patent claims.

The present invention permits experimental design for a prescribed number M of experiments to be carried out by means of uniform distribution of the experiments in a discretized parameter space which can be limited by secondary conditions. Expert knowledge of the user of the corresponding experimental design tool can be incorporated in this case, specifically, via the definition of a similarity measure between two different experiments, and the definition of a weighting measure for individual experiments.

It is possible in this way to achieve a very high flexibility in the specification of the experiments to be carried out and in the question of which experiments are considered as similar or dissimilar from the point of view of process. A further advantage is that experiments already carried out can also be taken into account for the experimental design.

Particularly advantageous is the use of the present invention for experimental design aimed at obtaining data for training neural networks or hybrid neural networks with rigorous model components. In particular, the invention can be used to achieve a uniform distribution of the experimental design in the relevant space such that a neural network or a hybrid neural network can be trained with the aid of a relatively low number of test data. This permits a very significant saving in time and cost for carrying out tests aimed at obtaining such a database, since the number of the tests required for training can be optimized by the invention.

Of particular advantage by comparison with the experimental design program known from the prior art is that any desired boundary conditions can be described in principle for the type of experiments. Moreover, it is possible via the weighting of the dissimilarity of two experiments to take account of prior knowledge, for example structural information about a process to be modelled—as early as during the experimental design.

A further particular advantage of the invention is to be seen in that the weighting of a collective of experiments and the weighting of individual experiments are performed by means of mutually different measures:

Firstly, a similarity measure is defined which represents a numerical value for the similarity or dissimilarity of two experiments. The background in this case is that the experiments to be designed are to be selected such that they are as dissimilar as possible. In this case, the user can define the meaning of similarity or dissimilarity for a specific test via the definition of the similarity measure.

A weighting measure with regard to the weighting of individual experiments can be prescribed by the user separately therefrom. The most varied criteria can be incorporated into this weighting measure, such as, for example, the facts of the test installation, costs for carrying out an experiment, the time required for carrying out an experiment, etc. For example, specific parameter combinations such as high pressure and high temperature simultaneously can lead to damage to the test installation, and so such "forbidden" parameter combinations can be provided with an appropriate weighting.

The similarity and weighting measures thus defined feature in a quality measure which combines the similarity measure and the weighting measure with one another. The quality measure is then used according to the invention to determine those experiments for which the quality measure assumes an extreme value. This extreme value is a maximum or a minimum of the quality measure depending on selection of similarity measure and weighting measure and the selection of the respective signs.

According to a preferred embodiment of the invention, the similarity measure is based on the Euclidean spacing of two experiments in a parameter space. Each experiment is defined by a vector which includes the parameter values for the various test variables for this concrete experiment. This parameter space is preferably discretized, that is to say the parameter values can assume only specific discrete values. The spacing of two experiments is therefore yielded, for example, as the Euclidean spacing of the parameter vectors of the experiments considered.

A reciprocal Euclidean spacing between two experiments is preferably defined as similarity measure. Furthermore, it is possible to define as similarity measure an exponential function which has the reciprocal Euclidean spacing of two experiments as exponent. Further definitions of similarity measures are possible as a function of the respective test scenario.

The weighting measure can also be defined in the form of a formula. Alternatively, the weighting measure can also be fixed in the form of a table or the like.

According to a preferred embodiment of the invention, the similarity measures of all the pairings of parameter vectors are calculated and summed in order to calculate the quality measure. Furthermore, the weighting measures are calculated for all experiments considered. The summed similarity measures and the summed weighting measures are then added or subtracted—depending on the definition of the similarity measure and of the weighting measure. The quality measure, which is to be minimized or to be maximized is then yielded from this addition or subtraction. According to a preferred embodiment of the invention, experiments already carried out can also be used for calculating the similarity measure and the weighting measure. If, for example, a number N of experiments have already been carried out, M new experiments are sought in the discrete parameter space. The quality measure is then calculated based on the N experiments already carried out and the M new experiments, in order to select the M new experiments.

According to a further preferred embodiment, the extreme value of the quality measure is determined by means of a Monte-Carlo method. Alternatively, it is possible to make use, for example, of a genetic algorithm or of another suitable numerical optimization method.

According to a further preferred embodiment of the invention, the experimental design program is linked to the installation control such that the parameter vectors of the experiments found can be transmitted directly to the controller.

Preferred exemplary embodiments of the invention are explained in more detail below with reference to the drawings, in which:

FIG. 1 shows a flowchart for the automatic design of experiments.

Figure 1:
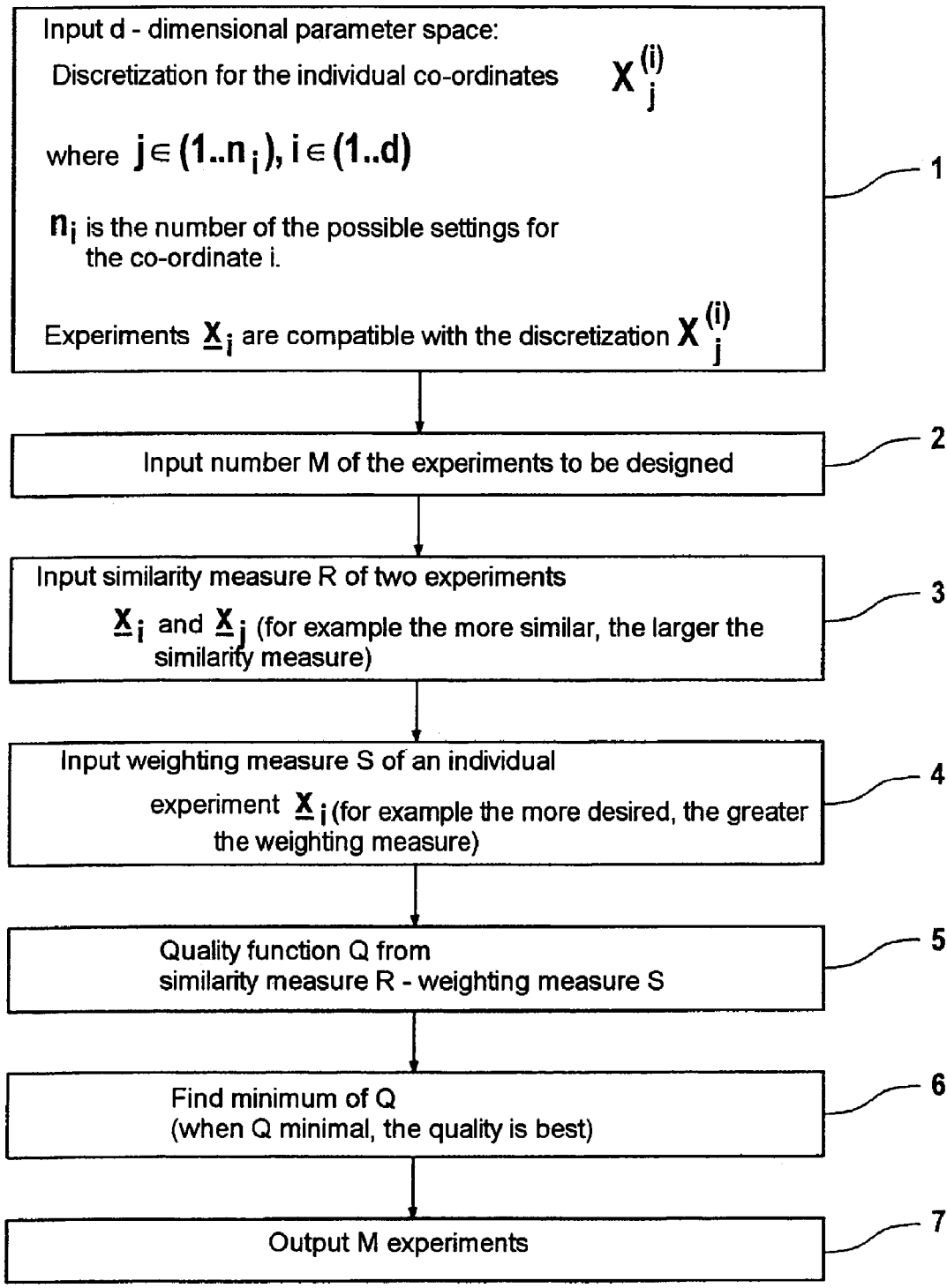
FIG. 1 shows a flowchart of a first embodiment of the method for the automatic design of experiments.

The experiments are to be designed in a d-dimensional parameter space.

Discretizations $$X_j^{(i)} \text{ of } j \in (1 \ldots n_i) i \in (1 \ldots d),$$

are prescribed for the individual co-ordinates. Here, $n_i$ denotes the number of the possible settings for the co-ordinate i.

This d-dimensional parameter space with its discretization is defined in step 1 of the method.

The inputting of the number M of the experiments to be designed is performed in step 2. The experimenter therefore has the possibility of prescribing the number of the experiments to be carried out anew.

The inputting of a similarity measure R of two experiments is performed in step 3. For example, the similarity measure R is defined such that the similarity measure is greater the more similar two experiments are. One possibility for defining the similarity measure R of two experiments $x_1$ and $x_2$ is specified as follows:

$$R(x_1, x_2) = f(|x_1 - x_2|_{eukl.}^{-2})$$

with a monotonically increasing function $f$, for example $f(z)=\exp(z)$ or $f(z)=z^k$.

A weighting measure S of an individual experiment $x_i$ is then input in step 4. This weighting measure S serves for weighting individual experiments which are compatible with the discretization X. For example, the experiment is held to be forbidden in the case of $S(x)=-\infty$, since it would, for example, lead to damage to the test installation.

Permitted experiments are, by contrast, weighted with a higher value S. The function S(x) can be stored in the form of a table, for example. In addition to the boundary conditions prescribed by the test installation, it is also possible for other criteria such as, for example, outlay on time and/or cost for carrying out a specific experiment to be mapped by means of the weighting measure S.

In general, the weighting measure S is selected in the form of a function or table such that it is greater the more an individual experiment is desired.

In step 5, this results in a quality measure Q which is based on the similarity measure R and the weighting measure S. In step 6, a minimum of the quality measure Q is determined, that is to say a selection of M experiments from the parameter space such that Q is minimized and thus the quality reaches a maximum.

Thus, in formal terms the experimental design problem solved in step 6 is:

N existing experiments $x_1 \ldots _N$ are given. M new experiments $x_{(N+1) \ldots (N+M)}$ are sought which are compatible with the discretization X for which it holds that $S(x_i) \neq -\infty$ and which minimize $$Q(|x|) = \sum_{i \neq j} R(x_i, x_j) - \sum_i S(x_i)$$

The M experiments determined in step 6 are output in step 7.

Of particular advantage in this embodiment of the experimental design according to the invention is that experiments to be carried out and existing differ as strongly as possible from one another, on the one hand, and that they are desired as individually as possible in each case, on the other hand. This structural approach permits a solution to the most complicated experimental design problems by formulating the measure for the dissimilarity of two experiments in a fashion adapted to the problem and, for example, by implementing secondary conditions via individual weightings of experiments. If the measure for the dissimilarity or similarity and the individual weighting function, that is to say the weighting measure, have been defined, the experimental design is reduced to an optimization problem which is to be solved by means of mathematical aids.

A few examples of different types of experimental design problems and their transformation with the aid of the method according to the invention are:

"hard" secondary conditions based on individual tests:
The invention permits not only a design of experiments which differ from one another as strongly as possible, but an individual weighting of experiments is made via the weighting measure S. "Hard" secondary conditions for experiments to be carried out can be described in this way. For example, it is possible to specify criteria which must be fulfilled or are not allowed to be fulfilled for all experiments. The experiments are uniformly distributed in the space thus limited. In particular, this possibility permits specific types of experiments to be excluded from the start. One possible way of implementing this is for a "forbidden" experiment to be given a weighting measure $S=-\infty$.

Processes with different "categories"
It may be assumed that the aim is to design experiments which serve the purpose of designing a process and in which customary continuous values, such as a pressure and a temperature, can be varied. Moreover, the aim is also, for example, to examine the addition of various alternative additives or installations (or parts thereof). The similarity of two experiments should be defined in the following way: tests with different additives/installations (or parts thereof) are weighted in principle as extremely dissimilar, since these are not comparable. The similarity is provided by the differences in pressure and temperature in the case of tests with the same additive.

Formulations
In the case of experimental designs for optimizing formulations, it is necessary, for example, for the quantities of given raw materials to be varied experimentally. Here, it is either possible to describe an experimental design via the ratios of the quantities of materials thrown in, or the formulation is formulated directly via the initial weights and summing up to 100% is required as boundary condition (→hard secondary condition).

Processes having a plurality of target variables/incomplete data:
Interesting questions arise for experimental design given the presence already of experimental data which are, however, incomplete. That is to say, either in the case of individual experiments not all parameters are logged, or else not all target variables (for example product quality properties) have been determined. It is decisive to establish for the weighting of experiments to be carried out anew whether a similar experiment already exists.

The answer to this question depends on which target variable is to be described. If a target variable has not been determined for a given experiment, this experiment cannot be used for modelling the unmeasured target variable. Thus, it should be required during the design of new experiments that the latter supply new information relating to as many output variables as possible. This can be realized in technical terms by separately determining the spacing relating to the existing experiments for all target variables, and subsequently averaging over the target variables.

Experimental planning with structural prior knowledge:
If structural prior knowledge is present about a process, this prior knowledge influences the question as to which experiments are to be regarded as similar or dissimilar. It is possible in many cases to calculate from the primary process parameters derived variables which characterize the mechanisms of the process (secondary process variables). The similarity measure R is then implemented such that the secondary variables are firstly calculated from the primary ones in order to determine the similarity therefrom.

Experiments on optimization:
In many cases, there will (for reasons of experimental capacity, alone) be no interest in modelling a process completely. Rather, it would be desired to specify an optimal operating point experimentally. An iterative procedure would be adopted in such a case.

In a first step, experiments are designed which permit a model to be built which can distinguish between good and poor operating states. On the basis of this model, a sequence of new experiments is designed which specifically examine the field of desired operating states more finely. This is realized with the aid of the weighting measure S. The data thus obtained can be used to improve the model in the parameter ranges of interest, and to set up a renewed test series which now places more ambitious stipulations on the process quality. This operation is repeated until an optimal state of the process has been found to a desired accuracy.

One possible method for solving this optimization problem, that is to say of selecting M experiments such that the quality measure Q assumes an extreme value, is the Monte-Carlo method.

Figure 2:
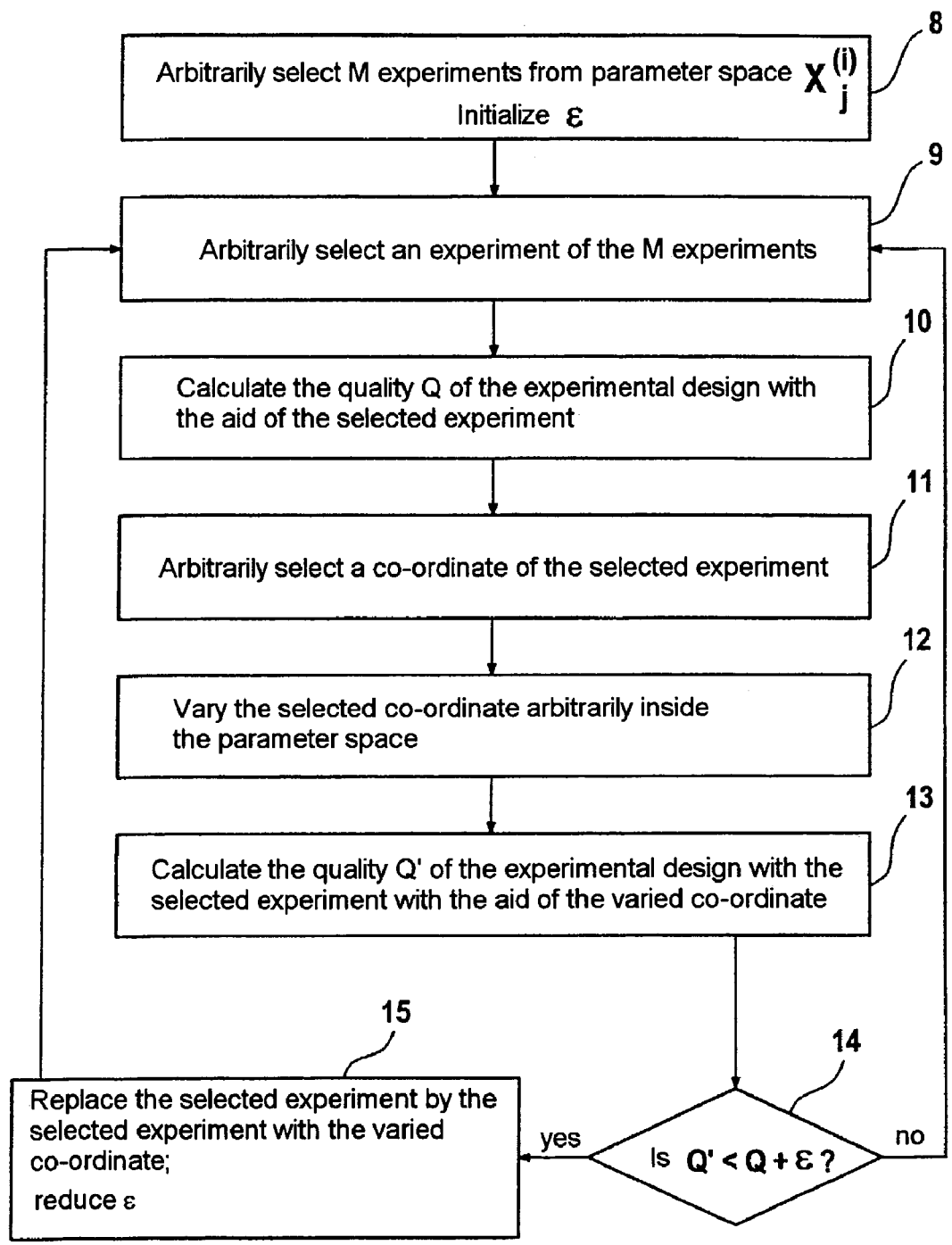
FIG. 2 shows a second embodiment, based on Monte-Carlo optimization.

FIG. 2 shows an embodiment with regard to implementing a Monte-Carlo method for solving the optimization problem.

In step 8, a number of M experiments are selected arbitrarily from the parameter space. Furthermore, a quality difference $\epsilon$ is initialized. An experiment is then arbitrarily taken in turn from these M experiments in step 9. The quality measure Q for the experimental design with this experiment is calculated in step 10.

A co-ordinate of this experiment is arbitrarily selected in step 11. If the co-ordinate is ordinal, it is preferably raised or lowered by one step; if the co-ordinate relates to category, it is randomly selected anew. This is performed in step 12.

The quality measure Q' is calculated in step 13 for the selected experiment with the varied co-ordinate. The quality measures Q and Q' are compared with one another in step 14. If $Q'<Q+\epsilon$, this means that the quality of the selected experiment with the varied co-ordinate is not substantially worse than the quality of the selected, unvaried experiment.

In this case, the experiment selected in step 9 is replaced in step 15 by this selected experiment with the varied co-ordinate. The quality difference $\epsilon$ is then reduced. If, by contrast, the quality has substantially worsened, the experiment originally selected in step 9 is retained. The quality difference ε can also be reduced in this case.

Steps 9 to 14 and, if appropriate, 15 are repeated until a stop condition is reached. The value of ε is continuously reduced to zero in this case. A stop condition can be, for example, a maximum number of iterations; another selection of a stop condition is when the quality measure Q no longer changes or no longer changes substantially. Thus, a minimum of the quality measure Q, and thus the M experiments being sought can be determined in this way (compare step 6 of FIG. 1).

Figure 3:
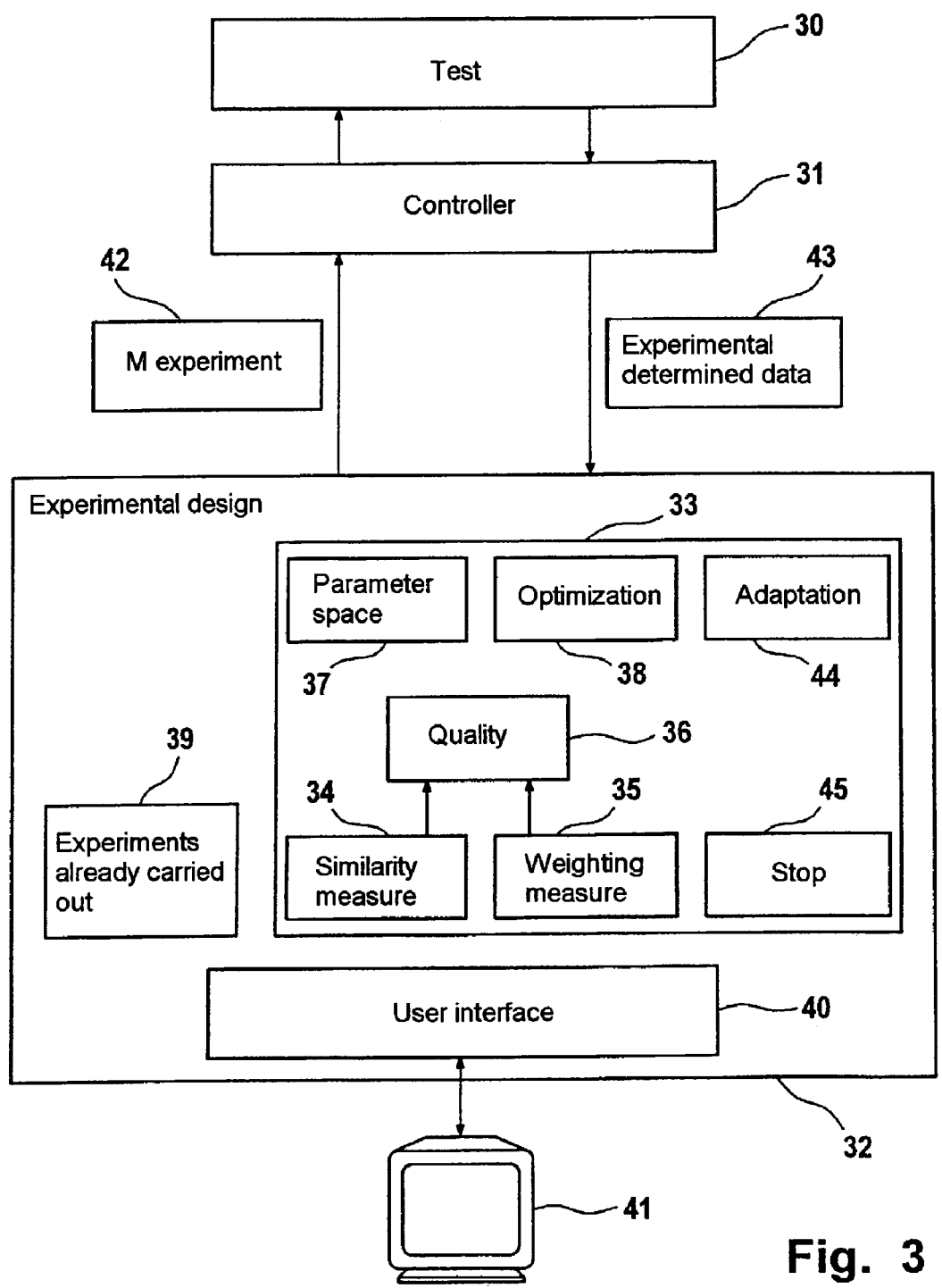
FIG. 3 shows a block diagram of an embodiment of a system according to the invention for automatic design, having a computer program product for carrying out the design.

FIG. 3 shows a block diagram of an embodiment of a system according to the invention. The system includes a test installation 30 for carrying out the experiments. The test installation 30 is controlled by a controller 31. The controller 31 is connected to a computer 32 which has a computer program 33 for carrying out the experimental design. The computer program 33 includes a function 34 for calculating the similarity measure, and a function 35 for calculating the weighting measure (compare steps 3 and step 4 of FIG. 1).

In order to permit an automated, cyclic operation of the overall system, the computer program 33 has an adaptation module 44 for adapting the weighting measure 35 to the results of the experiments 39 carried out.

Furthermore, the termination module 45 which terminates the method when a predefined termination criterion is reached is provided for the cyclic operation of the system.

Furthermore, the computer program 33 includes a function 36 for calculating the quality measure based on the functions 34 and 35 (compare step 5 of FIG. 1).

The computer program 33 further includes a mapping 37 of the discrete parameter space X (compare step 1 of FIG. 1). Furthermore, the computer program 33 includes a program module 38 for calculating an extreme value of the quality measure by means of the function 36, that is to say for selecting M experiments, such that the quality measure assumes an extreme value.

The computer 32 further has a memory 39 for storing the parameter vectors of experiments previously carried out. The computer program 33 for the extreme value calculation with the aid of the program module 38 can access this memory 39.

The computer 32 further has a user interface 40 which, via a display screen 41, can be employed by a user to input the functions 34, 35 and/or 36 as well as an adaptation scheme into the adaptation module 44, and to input a stop criterion into the termination module 45. Furthermore, the user can also specify the parameter space 37 via the user interface 40.

After the user has specified the functions 34, 35 and/or 36, and after a specification of the parameter space 37 has been provided, the experiments can be designed automatically by the computer program 33. For this purpose, the program module 38 accesses the memory 39 and the function 36 in order to optimize the latter, that is to say to find a number of M experiments such that the quality measure assumes an extreme value.

After the solution of this optimization problem, for example with the aid of a Monte-Carlo method (compare FIG. 2) or of a genetic or evolutionary algorithm, or by means of another mathematical optimization method, the parameter vectors of the M experiments to be carried out are present. These parameter values are transmitted to the controller 31 via a file 42, which has the form of a matrix, for example. The controller 31 undertakes the corresponding settings in the test installation and so the individual M experiments are carried out.

The controller 31 determines the measurement results of interest from the test installation 30 and combines them to form a file 43 which is transferred automatically to the computer 32. The user of the computer 32 can open the file 43 and, if appropriate, analyse it by means of further software. In order to design further M' experiments, the M experiments just carried out are transferred into the memory 39 such that these are also used during subsequent design for evaluating the functions 34, 35 and/or 36.

With the aid of the adaptation module 44, the computer program 33 can adapt the weighting measure 35 on the basis of all the experiments 39 carried out so far. The system uses the new settings to design the new test series, and transfers the experiments to the controller 31. This is repeated cyclically until a predefined stop criterion (termination module 45) is fulfilled, or the method is terminated by the intervention of the user via user interface 40.

| List of reference numerals | |
|---|---|
| Test installation | 30 |
| Controller | 31 |
| Computer | 32 |
| Computer program | 33 |
| Function | 34 |
| Function | 35 |
| Function | 36 |
| Processing | 37 |
| Program module | 38 |
| Memory | 39 |
| User interface | 40 |
| Display screen | 41 |
| File | 42 |
| File | 43 |
| Adaptation module | 44 |
| Termination module | 45 |

The invention claimed is:

1. Method for the automatic design of experiments, having the following steps:
   inputting a similarity measure of two experiments;
   inputting a weighting measure for an individual experiment;
   determining a quality measure based on the similarity measure and the weighting measure, wherein the quality measure is determined on the basis of the summed similarity measures of all of the experiments considered and of the summed weighting measures of all of the experiments considered; and
   finding a number of experiments in which the quality measure assumes an extreme value.

2. Method according to claim 1, in which the experiments can be selected from a discrete parameter space.

3. Method according to claim 1, in which the similarity measure is based on the Euclidean spacing of two experiments in a parameter space.

4. Method according to claim 1, in which the similarity measure is based on the reciprocal Euclidean spacing of two experiments in a parameter space.

5. Method according to claim 1, in which the weighting measure includes a weighting with regard to the feasibility and/or unfeasibility of an experiment.

6. Method according to claim 1, in which the weighting measure includes a weighting with regard to the costs or the required time for carrying out an experiment.

7. Method according to claim 1, in which the weighting measure is input in the form of a function.

8. Method according to claim 1, in which the weighting measure is input in the form of a table.

9. Method according to claim 1, in which a first number of experiments already carried out and a second number of experiments to be designed are considered for determining the quality measure.

10. Method according to claim 1, in which the experiments where the quality measure assumes an extreme value are found by means of a Monte-Carlo method.

11. Method according to claim 10, having the following steps:
    selecting a number (M) of experiments from a parameter space,
    selecting one of the selected experiments from the parameter space,
    calculating the quality measure for the selected experiment,
    selecting a co-ordinate of the selected experiment,
    varying the selected co-ordinate inside the parameter space,
    calculating the quality measure for the selected experiment with the varied co-ordinate,
    replacing the selected experiment by the selected experiment with the varied co-ordinate when the quality measure for the selected experiment with the varied co-ordinate yields as the quality measure for the selected experiment a quality not worse by at least one quality difference ($\epsilon$), and
    reducing the quality difference ($\epsilon$) to zero in steps.

12. Method according to claim 11, in which a number (N) of experiments already carded out are also taken into account for calculating the quality measure.

13. Method according to claim 1, in which a genetic algorithm is used to find a number of experiments where the quality measure assumes an extreme value.

14. Computer program product for carrying out a method according to claim 1.

15. Method for the automatic design of experiments, having the following steps:
    inputting a similarity measure of two experiments, wherein the similarity measure is based on an exponential function with a reciprocal Euclidean spacing of two experiments as exponent;
    inputting a weighting measure for an individual experiment;
    determining a quality measure based on the similarity measure and the weighting measure; and
    finding a number of experiments in which the quality measure assumes an extreme value.

16. System for the automatic design of experiments, having
    means (33, 39) for finding a number of experiments where a quality measure assumes an extreme value, the quality measure being based on a similarity measure of two experiments and a weighting measure of an individual experiment, wherein the quality measure is determined on the basis of the summed similarity measures of all of the experiments considered and of the summed weighting measures of all of the experiments considered, and
    means for outputting to a controller (31) for carrying out the experiments the experiments (42) found where the quality measure assumes an extreme value.

17. System according to claim 16, the means for finding being combined with means for storing (39) experiments already carried out and with means (44, 45) for automatically and cyclically carrying out the design of experiments.

* * * * *